United States Patent
Kunkel et al.

(10) Patent No.: US 12,289,375 B2
(45) Date of Patent: Apr. 29, 2025

(54) COMMUNICATION SYSTEM AND METHOD EMPLOYING PARALLEL CONNECTIONS TO SEND MESSAGES

(71) Applicant: The Travelers Indemnity Company, Hartford, CT (US)

(72) Inventors: Michael C. Kunkel, Glastonbury, CT (US); Michael G. Vece, Clinton, CT (US); Alexander B. Martinez, Colchester, CT (US); Damini P. Shah, Newington, CT (US); Fay F. Chen, Durham, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 0 days.

(21) Appl. No.: 18/370,539

(22) Filed: Sep. 20, 2023

(65) Prior Publication Data
US 2025/0097301 A1 Mar. 20, 2025

(51) Int. Cl.
*H04L 67/141* (2022.01)
*H04L 47/34* (2022.01)
*H04L 69/22* (2022.01)

(52) U.S. Cl.
CPC ............ *H04L 67/141* (2013.01); *H04L 47/34* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2013/0191525 A1* | 7/2013 | Kang | H04L 67/02 709/223 |
| 2015/0373162 A1* | 12/2015 | Mosko | H04L 45/40 370/392 |
| 2016/0127251 A1* | 5/2016 | Ovsiannikov | H04L 47/2441 370/415 |
| 2016/0337424 A1* | 11/2016 | Mandyam | H04L 67/56 |
| 2019/0036811 A1* | 1/2019 | Lapidous | H04L 1/1867 |
| 2022/0224779 A1* | 7/2022 | Sung | H04L 69/16 |

* cited by examiner

Primary Examiner — June Sison
(74) Attorney, Agent, or Firm — Dilworth IP, LLC (57) ABSTRACT

A system and method is presented for sending a message between devices in a communication network. The system includes a first processor and a first memory in communication with the first processor. The first processor executes instructions stored in the first memory to divide the message into a plurality of segments according to a first procedure and assign a respective sequence number to each segment, and to construct a plurality of packets. Each packet comprises a payload and a header. The payload comprises at least one segment. The first processor further establishes a plurality of parallel socket connections, each to a second processor, and passes respective packets to respective parallel socket connections. The parallel socket connections are selected according to a second procedure, for transmission to the second processor until a determined number of segments has been successfully received and processed by the second processor.

24 Claims, 4 Drawing Sheets

COMMUNICATION SYSTEM AND METHOD EMPLOYING PARALLEL CONNECTIONS TO SEND MESSAGES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

1. Technical Field

The present disclosure relates generally to network communication systems and methods thereof and, more particularly, the present disclosure is related to network communication systems and methods for performing efficient data transfer between devices over a network by employing parallel communication connections for sending data from a sender device to a receiver device.

2. Related Art

Generally speaking, messages and files containing data are transferred over a network between devices in one or more packets. Conventional protocols for transferring data in packets over networks such as the Internet include, for example, a network layer/routing protocol such as an Internet Protocol (IP) and delivery protocols such as a Transmission Control Protocol (TCP), User Datagram Protocol (UDP), and Reliable Data Protocol (RDP). Typically, when a first (sender) device seeks to transfer a message or file to a second (receiver) device, processing on the first device breaks the message or file into two or more pieces, which are assembled as data packets. The data packets are then transferred to the second (receiver) device over a communication connection established between the first and the second devices such as, e.g., a TCP/IP connection. In conventional transfer processes, the TCP communication is single threaded whereby packets are sent serially from the first (sender) device to the second (receiver) device. If one or more packets are lost in transfer, e.g., communication connection is dropped or closed, the first device resends the lost packets to the second device. Once all packets are successfully transferred, processing on the second (receiver) device reassembles the received packets to rebuild the message or file.

With the growing use of network communication as well as distances between sending and receiving devices, networks are experiencing an increased rate of packet losses. Accordingly, there is a need for more efficient and reliable network communication systems and methods for performing data transfer between devices over a network.

SUMMARY OF THE INVENTION

The present invention is directed to a system and method for sending a message or file between devices in a communication network. In one aspect of the invention, the system includes a first processing device and a first memory device in communication with the first processing device. The first memory device stores first instructions that when executed by the first processing device result in dividing the message or file into a plurality of segments according to a first determined procedure and assigning a respective sequence number to each segment, and in constructing a plurality of packets. Each of the packets comprises a payload and a header. The payload comprises at least one of the segments. The header comprises a unique message identifier, the sequence number of each segment of the payload, and a total quantity of segments of the message. The first instructions, when executed by the first processing device further results in the first processing device establishing a plurality of parallel socket connections, each to a second processing device, and passing respective packets to respective parallel socket connections. In one embodiment, the parallel socket connections are selected according to a second determined procedure, for transmission to the second processing device until each segment of a determined number of the total quantity of segments has been successfully received and processed by the second processing device.

In one embodiment, a respective segment is processable by the second processing device independent of any other segment. In one embodiment, the respective segment includes at least one of computer code including source code or machine code, numerical data, image data, video data, audio data, text, and mathematical equations. In still another embodiment, the first determined procedure of dividing the message comprises including undivided content of the message in a respective segment, where the undivided content comprises at least one of a functional unit of the computer code, a set of the numerical data, an encoded portion of the image data, an encoded portion of the video data, an encoded portion of the audio data, a sentence, paragraph, or section of the text, and a set of the mathematical equations. In one embodiment, a processing of the respective segment by the second processing device comprises at least one of passing the respective segment in part or whole to one of a plurality of third processing devices for processing of the respective segment, saving the respective segment in part or whole to a database, converting, compiling, decompiling, analyzing, refactoring, or executing the computer code, analyzing or performing arithmetic operations with the numerical data, analyzing or transforming the image data, the video data, or the audio data, analyzing, transforming, or translating the text, and analyzing, transforming, or evaluating the mathematical equations.

In one embodiment, the header of each packet further includes at least one of a status of transfer and processing of the respective segment, an indication of a type of content within the respective segment, and an indication of a type of processing of content within the respective segment to be performed. In one embodiment, the second determined procedure of selecting parallel socket connections comprises at least one of round-robin selection method, random selection method, a selecting least-recently-busy sockets first method, a selecting highest-bandwidth sockets first method, a selecting sockets having largest available send-buffer space first method, and a selecting sockets on which a packet-acknowledgment message sent by the corresponding second processing device is least-recently-received first method. In one embodiment, the determined number of the segments, which may conclude the passing step, equals the total quantity of segments of the message. In one embodiment, a receipt from the second processing device of a packet-acknowledgment message indicating a respective sequence number, indicates that the second processing device has successfully received and processed the segment corresponding to the respective sequence number.

In still another embodiment, the first processing device executing the first instructions further results in assigning a respective priority to each segment of the plurality of segments, and where the passing of the respective packets to the respective parallel socket connections is performed in accordance with the priority assigned to the segment within the respective packet. In one embodiment, the determined number of the segments, which may conclude the passing step, consists of all segments having a respective priority greater than a determined priority. In still another embodiment, the determined number of the segments, which may conclude the passing step, is based on at least one of one of a defined quantity of the total quantity of segments and a defined percentage of the total quantity of segments.

In another aspect of the invention, a system for sending a message or file between devices in a communication network includes a first processing device, a second processing device, and a plurality of third processing devices. The first processing device is in communication with a first memory device. The second processing device is in communication with a second memory device. The plurality of third processing devices are each in communication with a respective plurality of third memory devices. The first memory device stores first instructions that when executed by the first processing device result in the first processing device dividing a message into a plurality of segments according to a first determined procedure and assigning a respective sequence number to each segment, and in constructing a plurality of packets. Each packet comprises a payload and a header. The payload comprises at least one of the plurality of segments. The header comprises a unique message identifier, the sequence number of each segment of the payload, and a total quantity of the plurality of segments of the message. The first instructions, when executed by the first processing device further results in the first processing device establishing a plurality of parallel socket connections to the second processing device, and in passing respective packets to respective parallel socket connections for transmission to the second processing devices until each segment of a determined number of the total quantity of the plurality of segments has been successfully received and processed by the second processing device. The parallel socket connections are selected according to a second determined procedure.

The second memory device stores second instructions that when executed by the second processing device result in the second processing device receiving transmitted ones of the respective packets on the respective parallel socket connections from the first processing device and distributing each of the respective packets to a respective one of the plurality of third processing devices for processing. The second processing device further receives a status message related to a completion of processing of each of the distributed respective packets by the plurality of third processing devices and transmits the status of the processing of each packet with one of a success or a failure indication to the first processing device. The second processing device further receives a reassembled message from one of the plurality of third processing devices and stores the reassembled message in the second memory device to conclude its processing.

Each of the third memory devices stores third instructions that when executed by each of the respective ones of the plurality of third processing devices result in receiving, by the respective one of the plurality of third processing devices, the distributed packet from the second processing device, in processing the at least one of the segments within the distributed packet. When processing is successful, the third processing device stores the processed at least one of the segments in the third memory device associated with the respective one of the plurality of third processing devices, and returns a status of the processing to the second processing device, where the status includes at least one of a success and a failure indication. When the success status is returned, the respective one of the plurality of third processing devices determines whether a next packet is available for processing. When it is determined that no next packet is available for processing, the respective third processing device assembles the processed plurality of segments within the plurality of third memory devices to form the reassembled message or file and returns the reassembled message or file to the second processing device.

BRIEF DESCRIPTION OF THE DRAWINGS

Referring now to the Figures, which are exemplary embodiments, and wherein like elements are numbered alike.

DETAILED DESCRIPTION OF PREFERRED EMBODIMENTS

Figure 1:
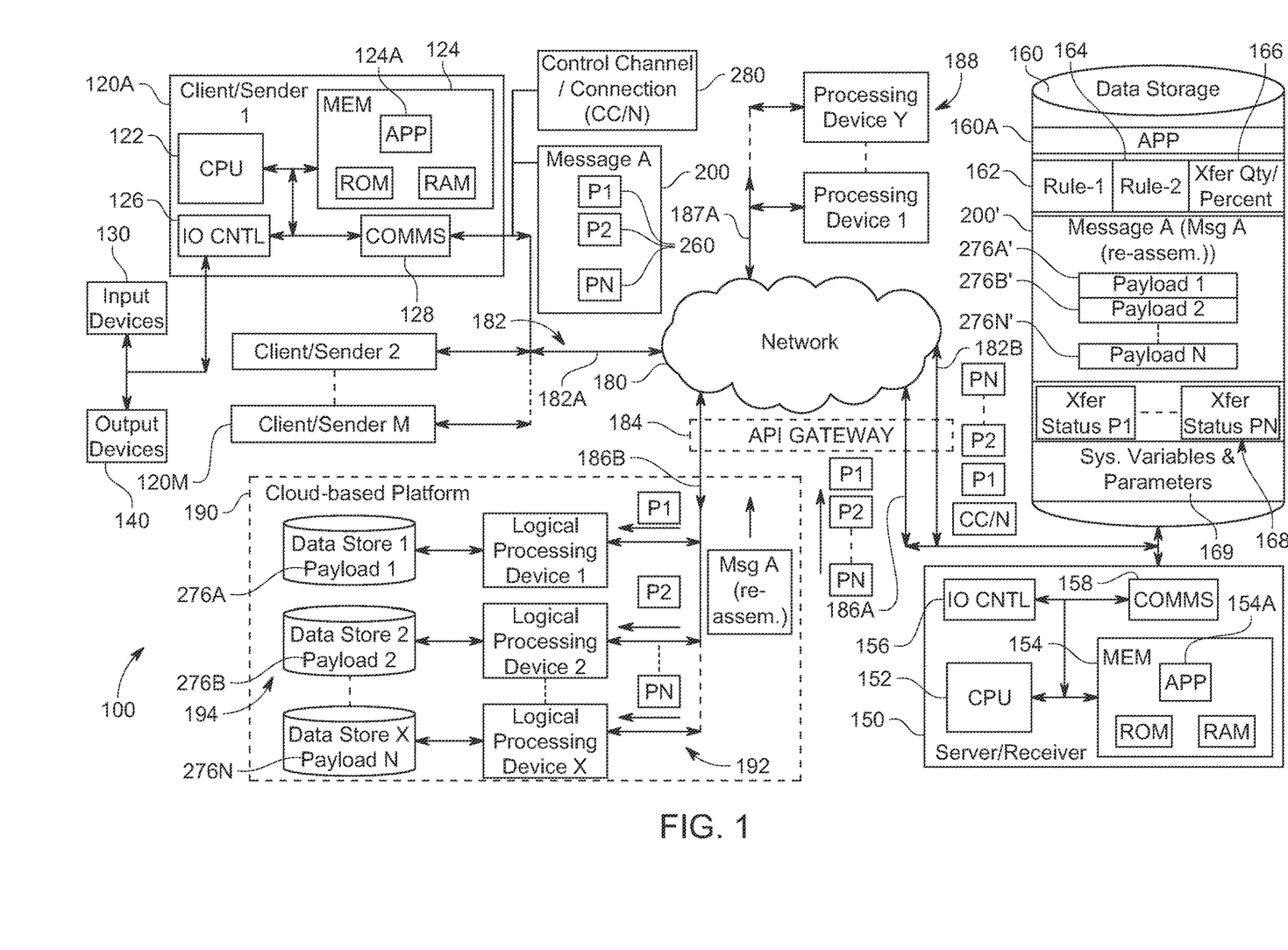
FIG. 1 is a schematic diagram of a communication system, according to one embodiment of the present invention.

FIG. 1 depicts a simplified block diagram view of a communication system 100 that performs efficient data transfer transactions between devices over a network by employing parallel communication connections for transmitting data from a sender device to a receiver device, according to one embodiment. The system 100 includes a plurality of client or sender devices, shown generally at 120, including client/sender devices 120A to 120M, operatively coupled to and in communication with a network 180. In one embodiment, each of the client/sender devices 120 includes or is operatively coupled via the network 180 to one or more processors (CPU) 122, memory (e.g., internal memory (MEM) 124 including hard drives, ROM, RAM, and the like), and/or data storage (e.g., hard drives, optical storage devices, and the like) as is known in the art. In one embodiment, each of the client/sender devices 120 includes or is operatively coupled to one or more input devices 130 and one or more output devices 140 via an input/output controller (IO CNTL) 126. In one embodiment, the input devices 130 include, for example, a keyboard, mouse, stylus, or like pointing device, buttons, wheels, touch pad, or touch screen portions of a display device, or input ports, and/or combinations thereof, for receiving and providing data and information to the client/sender device 120. In one embodiment, the output devices 140 include, for example, one or more display devices integral with or operatively coupled to the client/sender device 120 to exhibit visual output, a speaker to provide audio output, and/or a printer to provide printed output. In one embodiment, the visual and printed output includes documents, images, and other visual representations of data and information from the system 100. In one embodiment, the output devices exhibit one or more graphical user interfaces (GUIs) (not shown) that may be visually perceived by a user/operator operating one of the client/sender devices 120. It should also be appreciated that for clarity purposes, components (e.g., CPU, MEM, IO CNTL, input and output devices and the like) are depicted in FIG. 1 only with reference to Client/Sender Device 1 but equally may correspond to one or more of the other client/sender devices 120 (Client/Sender Device 2 to Client/Sender Device M). In one embodiment, the client/sender devices 120 include, for example, a personal computer or workstation, or portable computer processing devices such as, for example, a personal digital assistant (PDA), iPAD™ device, tablet, laptop, mobile radio telephone, smartphone (e.g., Apple™ iPhone™ device, Google™ Android™ device, etc.), or the like. It should be appreciated that the designations Apple, iPhone, and iPad are trademarks of Apple Inc. of Cupertino, California. It should also be appreciated that the designations Google and Android are trademarks of Google LLC of Mountain View, California.

In one embodiment, the communication system 100 and each of the client/sender devices 120 may be operatively coupled to and in communication with, via the network 180, a server 150. In one embodiment, the server 150 includes one or more processors (CPU) 152, memory (e.g., internal memory (MEM) 154 including hard drives, ROM, RAM, and the like), an input/output controller (IO CNTL) 156 for receiving and outputting data and information via input and output devices coupled thereto (not shown), and/or one or more data storage devices 160 (e.g., hard drives, optical storage devices, and the like) as is known in the art. In one embodiment, illustrated in FIG. 1, each of the client/sender devices 120 and the server 150 include communication circuitry (COMMS) 128 and 158, respectively, such as a transceiver or network interface card (NIC), for operatively coupling the client/sender devices 120 and the server 150 by wired or wireless communication connections to the network 180 such as, for example, a local area network (LAN), an intranet, extranet, or the Internet, and in some embodiments to processing devices (described below) and/or data storage devices (not shown), also operatively coupled to and communicating with the network 180. It should be appreciated that, while not shown, the network 180 may include, for example, cell towers, routers, repeaters, ports, switches, and/or other network components that comprise the Internet and/or a cellular telephone network and/or Public Switched Telephone Network (PSTN), as is known in the art. It should also be appreciated that the network 180 may include or utilize, for example, components and/or resources in a "cloud" or virtual environment (as described below). It should also be appreciated that communication and transfer of data between devices coupled to the network 180 may occur through protocols operating at various Open Systems Interconnection (OSI) model layers including, for example, Transmission Control Protocol/Internet Protocol (TCP/IP) on the Transport and Internet layers and/or the Hypertext Transfer Protocol (HTTP) and interfaces such as, for example, socket Application Programming Interfaces (APIs) operating on the Application layer, as are known in the art.

In one embodiment, the client/sender devices 120 and the server 150 cooperate to implement the communication system 100 that employs a plurality of parallel communication connections, shown generally at 182, for sending a message or file from an application executing on one of the client/sender devices 120 to an application executing on the server/receiver device (e.g., server 150), e.g., a message or file with a relatively large size content and therefore a relatively high transfer-time. In one embodiment, the communication system 100 employs the plurality of parallel communication connections 182 when sending a message or a file having a size such that the processing time to transfer the message or file from the application on one of the client/sender devices 120 to the server/receiver device 150 does not exceed a predetermined transfer-time threshold. For example, in one embodiment, the predetermined transfer-time threshold is below an accepted processing time prior to timeout (e.g., HTTP request-response timeout), and is set at, for example, one of between about ten seconds to thirty seconds (between about 10 secs. to 30 secs.), greater than about twenty second (>20 secs.), or greater than about thirty seconds (>30 secs.). It should be appreciated that it is within the scope of the present invention to employ other transfer-time thresholds, and that the aforementioned timeout periods are provided merely as exemplary thresholds. In one embodiment, the transfer-time threshold is a variable set by, for example, an administrator of the communication system 100 and stored in the data storage device 160 with other system variables and/or parameters shown generally at 169.

In one aspect of the communication system 100, the client/sender devices 120 and the server 150 execute a plurality of programmable instructions of a multifunctional software application or app (e.g., "APP") of the system 100, or portions or modules thereof, 124A, 154A, or 160A, stored in local memory 124, 154, or network memory 160, respectively, to implement the communication system 100 and features and/or functions thereof for sending the message or the file over the plurality of parallel communication connections 182. In one embodiment, APPs may execute differing functionality to implement "client/sender-side" features and/or functions and/or "server/receiver-side" features and/or functions of the system 100, as described herein and referenced generally at 300 and 400 in FIGS. 3 and 4, respectively. For example, and as described herein with reference to FIG. 3, APP 124A executes the client/sender-side features and/or functions 300 to detect, at Step 310, e.g., automatically and/or by receiving a notification message, an instruction to upload or send a message or file, depicted in FIGS. 1 and 2 as a Message A 200. Once detected, the client/sender-side APP 124A executes background processing (e.g., transparent to one of the operators of the client/sender devices 120) to determine, at Step 320, whether the size of the message or file, e.g., the Message A 200, is such that the processing time for the transfer is above the predetermined transfer-time threshold value. If not, the client/sender-side APP 124A concludes by passing along a "No" path from Step 320 to Step 380 as the message or file is processed according to conventional file transfer protocol. If the size of the message or file, e.g., the Message A 200, is such that transfer processing time is above the transfer-time threshold value, the client/sender-side APP 124A continues along a "Yes" path from Step 320 to Step 330, where the APP 124A evaluates and divides, parses, or otherwise extracts portions of content, shown generally at 210, of the Message A 200 into a plurality of pieces or segments, shown generally at 240 in FIG. 2. The client/sender-side APP 124A performs the extraction of content 210 in accordance with a first determined procedure or process implementing a ruleset or Rule-1 162, stored in the data storage device 160 and provided to the APP 124A at Step 332. In one embodiment, the first determined procedure and Rule-1 defines varying types of independently processable content that is extracted from the Message A 200. In one embodiment, the content type is provided by the client/sender-side APP 124A to the server/receiver-side APP 154A to inform its processing of the extracted content. In one embodiment, the first determined procedure implementing Rule-1 162 requires that each segment 240 of the message or file (e.g., Message A 200) is processable by a processing device independent of any other of the plurality of segments 240 of the message or file. In some embodiments, the first determined procedure implementing Rule-1 162 defines that the segments 240 include content 210 based upon content type or size, for example, a size such that the processing time to transfer a packet including one or more of the segments is a percentage below the predetermined transfer-time threshold.

Figure 2:
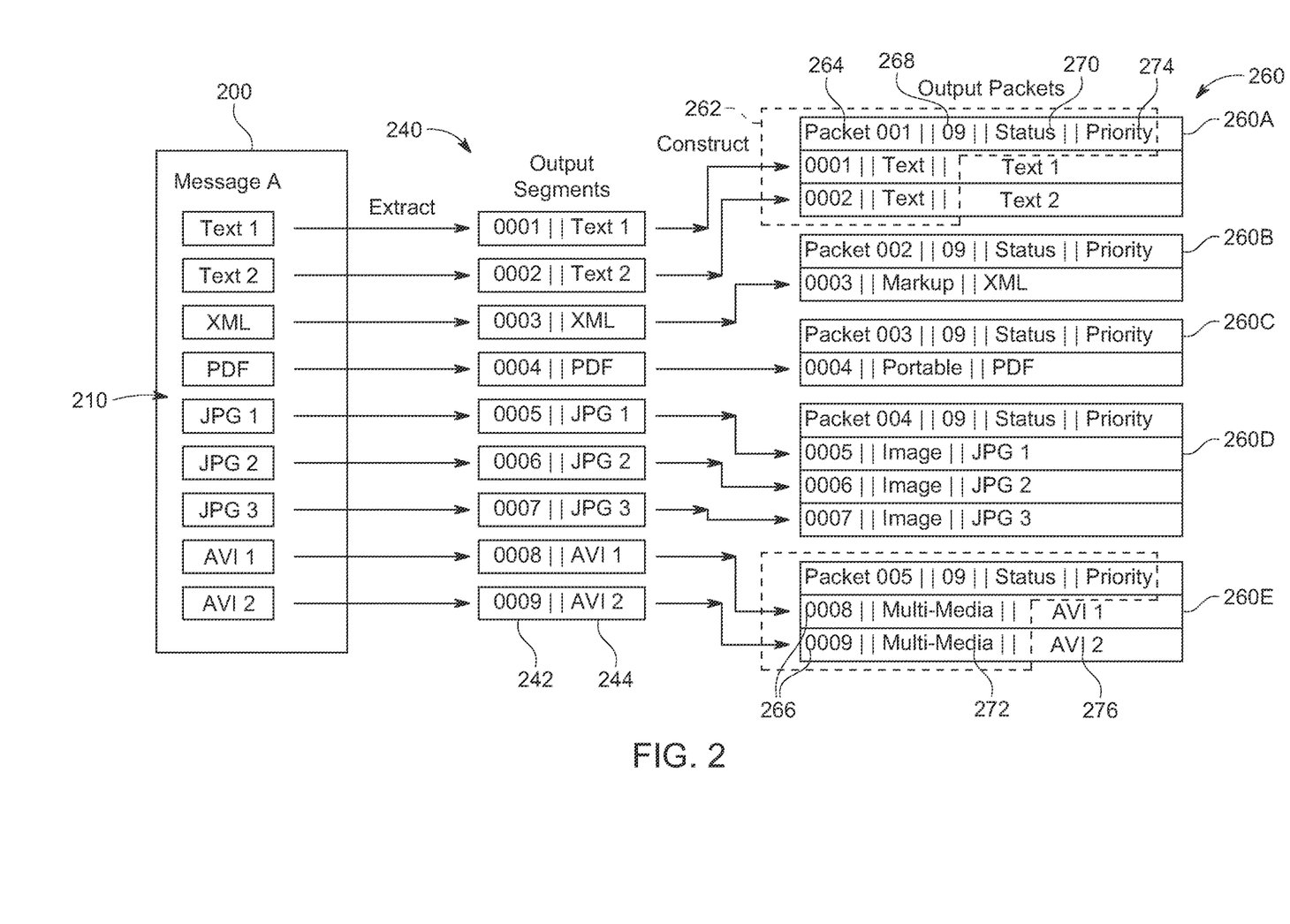
FIG. 2 is a functional block diagram depicting content of a message or file being extracted to construct packets to transfer the message or file over the communication system of FIG. 1, according to one embodiment of the present invention.
Figure 3:
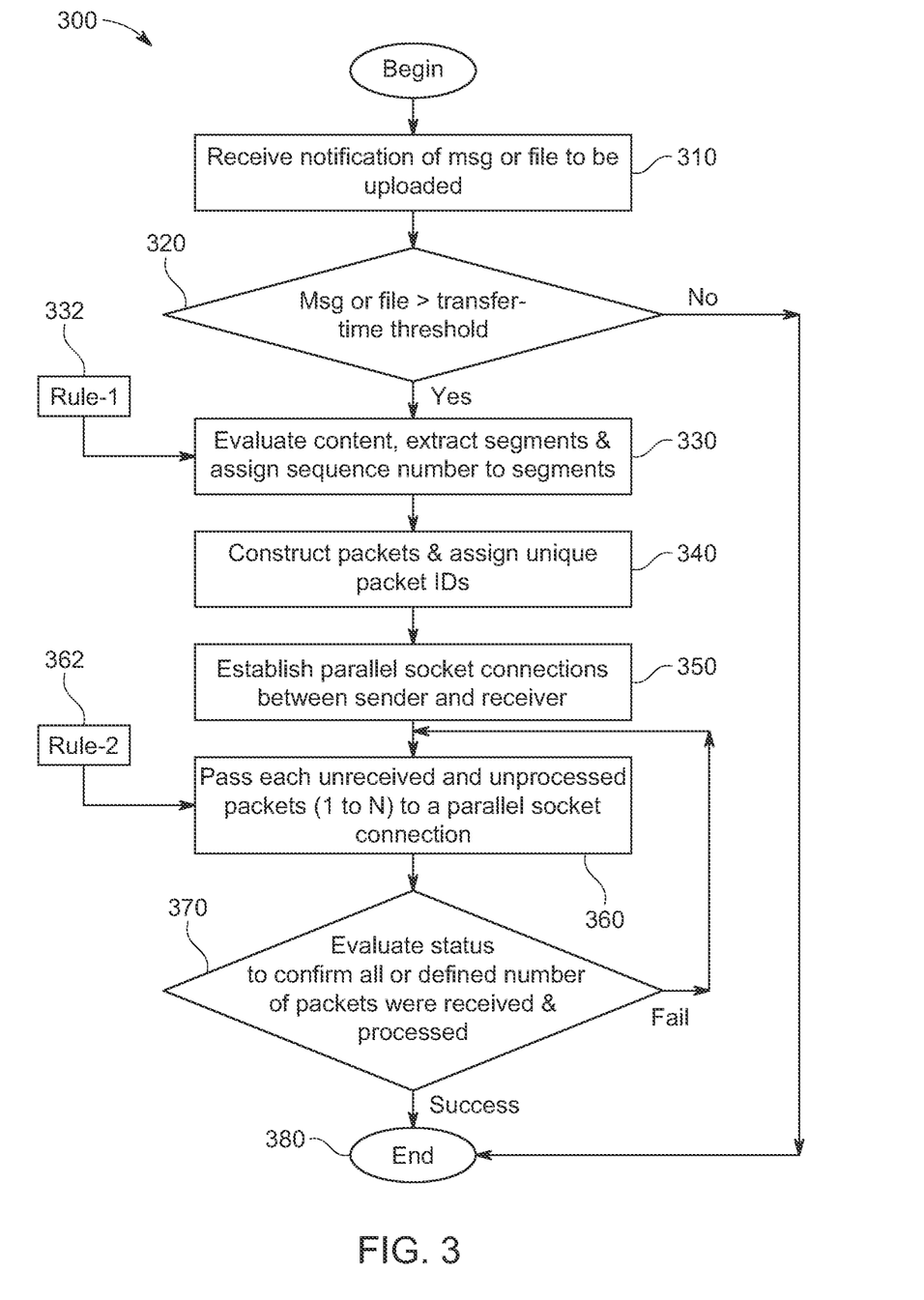
FIG. 3 is a flow diagram of a client/sender-side method within the communication system of FIG. 1, according to embodiments of the present invention.

As shown in FIG. 2, APP 124A executes to evaluate the content 210 of Message A 200 and to divide, parse, or extract portions of the content 210 into the independently processable segments 240. In one embodiment, the first determined procedure implementing Rule-1 162 divides or extracts content 210 to output the plurality of segments 240 of the Message A 200. In one embodiment, the extracted content 210 may include, for example, computer code including source code or machine code, numerical data, mathematical equations, image data, video data, audio data, text, and mathematical equations, and the like, and/or combinations and/or encoded portions thereof. As shown in FIG. 2, in one embodiment, the segments 240 output by the extraction of the first determined procedure include a sequence number portion 242 and a content portion 244. In one aspect of the communication system 100 described herein, at Step 330 the client/sender-side APP 124A assigns a sequence number, stored in the sequence number portion 242, to each of the extracted portions 244 of content 210 to preserve a relationship of each output segment 240 to the Message A 200, thus ensuring the integrity of the content/data within the Message A 200. In one embodiment, the sequence number stored within the sequence number portion 242 is a numeric value indicating an order of occurrence of the extracted content portion 244 of the content 210 within a structure of the Message A 200 such that in later processes (defined below), Message A 200 may be reassembled at or in proximity to, for example, the destination address as a complete and accurate representation of the Message A 200. As depicted in FIG. 2, Message A 200 includes one or more independently processable portions of content 210 such as, for example, text data (e.g., data labeled "Text 1" and "Text 2"), Extensible Markup Language data (e.g. data labeled "XML"), Portable Document Format data (e.g., data labeled "PDF"), digital image data (e.g., data labeled "JPG 1", "JPG 2", and "JPG 3"), and video file format data (e.g., data labeled "AVI 1" and "AVI 2"). It should be appreciated that, while FIG. 2 depicts specific types of content 210 including, for example, text data, Extensible Markup Language data, Portable Document Format data, digital image data, and video file format data, the present invention is not limited to evaluating, extracting, and/or processing only these forms of content or to extracting content merely based upon its content type as other considerations (e.g., data size, estimated processing time, etc.) may guide extraction. In the embodiment illustrated in FIG. 2, at the conclusion of the first determined procedure, the Message A 200 is divided into nine segments 240, having sequence number portions 242 labeled from "0001" to "0009" and the extracted, independently processable portions 244 of content 210 including "Text 1", "Text 2", "XML", "PDF", "JPG 1", "JPG 2", "JPG 3", "AVI 1", and "AVI 2", each associated with a respective sequence number.

In one embodiment, at Step 340 the client/sender-side functionality of APP 124A continues to execute and constructs or assembles the extracted plurality of segments 240 in a plurality of packets, shown generally at 260 of FIG. 2. The packets 260 are transferred from the client/sender device 120 (e.g., a source) to the server 150 (e.g., destination) in parallel using the plurality of communication connections, e.g., implemented in one embodiment as socket connections (described below). In one embodiment, illustrated in FIG. 2, each of the packets 260 is constructed to include a header portion, shown generally within a dashed box at 262, and a payload portion 276. In one embodiment, the header portion 262 includes a unique message identifier section 264, a sequence number section 266 that includes each segment number portion 242 corresponding to each content portion 244 included in the payload portion 276, and a total quantity section 268 that includes a quantity of the total number of segments of the message being sent, e.g., Message A 200. In one embodiment, the header portion 262 also includes a status section 270 that is employed to pass a status message indicative of the success and/or failure of packet transfer and processing such as, for example, a positive acknowledgement message having a "success" or ACK value and/or a negative acknowledgement message having a "failure" or NACK value, as described below. In one embodiment, the payload portion 276 includes one or more of the content portions 244 of the extracted segments 240 (e.g., each of the content portions 244 of the extracted segments identified by each segment number portion 242 in the sequence number section 266). For example, and with reference to FIG. 2, a first one 260A of the packets 260 includes the header portion 262 having the unique message identifier section 264 labeled "Packet 001", the sequence number section 266 having segment number portions 242 labeled "0001" and "0002" for the content 210 in the payload portion 276 labeled "Text 1" and "Text 2", and a total quantity section 268 having a quantity labeled "09" for the total number of segments 240 of the message being sent, e.g., Message A 200. As depicted in FIG. 2, in one embodiment, the client/sender-side APP 124A executes to extract and output nine segments 240 (e.g., the segments having sequence number portions 242 labeled "0001" to "0009") and to constructed and output five packets 260, e.g., packets 260A to 260E, having unique message identifier sections 264 labeled from "Packet 001" to "Packet 005". It should be appreciated that while FIG. 2 depicts an exemplary consolidation of nine segments 240 output from the extraction process to five constructed packets 260 for transfer, it is within the scope of the present invention to construct other arrangements, e.g., a consolidation resulting in more or less constructed packets 260 and/or for there to be an equal number of packets 260 constructed for the output segments 240. It should also be appreciated that while FIG. 2 depicts a consolidation of segments 240 having a same content type (e.g., a first packet 260A labeled "Packet 001" having text content and a second packet 260B labeled "Packet 002" having XML content), it is also within the scope of the present invention to consolidate segments within a packet that are of a different content type. In one embodiment, it is within the scope of the present invention that certain types and/or sizes of content may be expressly combined and/or separated to, for example, maximize processing time in, for example, a "best fit" processing mode wherein content type and/or size and estimated processing time are considered in the consolidation processing. For example, some content such as image data and/or video data, typically are of a relatively large size and/or require relatively longer processing time, therefore, segments 240 having such content may not be consolidated, but rather, placed alone in an individual one of the packets 260 for selective transfer and processing to maximize performance. As noted above, the constructed packets 260 include independently processable content and are also formed to maximize reliability and efficiency in data transfer.

Once packets 260 are constructed, the client/sender-side APP 124A continues to execute by establishing, at Step 350, a plurality of parallel communication connections, e.g., the socket connections 182 of FIG. 1, including socket connections 182A on a client/sender-side from a source/sending one of the client/sender devices 120 to socket connections 182B on a server/receiver-side at a destination/receiving device, e.g., the server 150, to transfer the packets 260 constructed from the content 210 of Message A 200. In one embodiment, each of the plurality of parallel socket connections 182 are established as socket application programming interfaces (APIs) between the client/sender-side APP 124A and the server/receiver-side APP 154A instantiated via an API Gateway 184. As should be appreciated by those skilled in the art, the parallel socket API connections 182 allow the applications running on the source/sending one of the client/sender devices 120 and the destination/receiving server 150 (APP 124A and APP 154A, respectively) to communicate data and information over the network 180. As noted above, the source/sending one of the client/sender devices 120 and the destination/receiving server 150 (APP 124A and APP 154A, respectively) communicate the status of the transfer and processing of each packet 260 via the status section 270 within the header portion 262 of each packet 260 including the positive acknowledgement message having a "success" or ACK value indicating successful transfer and processing and the negative acknowledgement message having a "failure" or NACK value indicating an unsuccessful transfer and processing of each of the respective packets 260. Optionally, in one embodiment the client/sender-side APP 124A and the server/receiver-side APP 154A dedicate one of the plurality of parallel socket connections 182 as a control channel or control connection, depicted in FIG. 1 as Control Channel/Connection (CC/N) 280. In this optional embodiment, the Control Channel/Connection 280 provides redundancy in the status message processing between the client/sender-side APP 124A and the server/receiver-side APP 154A. As should be appreciated, status messages received within the status section 270 of the header portion 262 of each respective packet 260 and/or the message received over the Control Channel/Connection CC/N 280 are indicative of at least one of a "success" or a "failure" of receipt and/or processing of the packets 260 transferred over the plurality of parallel socket connections 182. In one embodiment, the status message (received within either or both the status section 270 and/or the Control Channel/Connection CC/N 280) includes an acknowledgement that a respective one of the packets 260 was received over a specific one of the plurality of parallel socket connections 182 and processed successfully. In one embodiment, status messages for the packets 260 transferred over the plurality of parallel socket connections 182 are stored in the data storage device 160, shown generally at 168 (e.g., as "Xfer Status P1" to "Xfer Status PN" for each of 1 to N packets 260 transferred from the client/sender-side APP 124A executing on the source one of the client/sender devices 120 to the server/receiver-side APP 154A executing on the destination server 150), for later access and evaluation of the respective socket connections 182 (e.g., its efficiency, latency, or preference in a next packet transfer in accordance with a selection method described herein). As should be appreciated, providing status of transfer within the status message section 270 and/or over specific socket connections 182 via the Control Channel/Connection CC/N 280 assists in identifying and combating network issues such as, for example, packet loss, high-latency (e.g., relatively slow and/or unreliable) connections, or like adverse conditions to throughput and efficient data transfer.

At Step 360 the client/sender-side APP 124A continues to execute by passing one of the packets 260 constructed from the content 210 of Message A 200 to one of the plurality of parallel socket connections 182 in accordance with a second predetermined procedure or process implementing a ruleset or Rule-2 164, stored in the data storage device 160, and provided to the APP 124A at Step 362. In one embodiment, the second determined procedure implementing Rule-2 164 for selecting one of the plurality of parallel socket connections 182 for transferring the packets 260 includes one of a round-robin selection method, a random selection method, a least-recently-busy socket first selection method, a highest-bandwidth socket first selection method, a socket having a largest available send-buffer space first selection method, and a socket on which a packet-acknowledgment message sent is least-recently-received first. It should be appreciated that the present invention is not limited to these selection methods as it is within the scope of the present invention to employ other methods for selecting a next one of the plurality of parallel socket connections 182 to maximize packet throughput and more efficient data transfer between the source one of the client/sender devices 120 and the destination server 150 (e.g., APP 124A and APP 154A, respectively). It should also be appreciated that the second determined procedure implementing Rule-2 164 for selecting one of the plurality of parallel socket connections 182 is employed to pass a first set of the packets 260 over the established plurality of parallel communication connections, e.g., the socket connections 182 of FIG. 1. Once the first set of packets 260 fill available ones of the established plurality of parallel communication connections 182, a next packet 260 to be transferred is assigned to a first, next available one of the established plurality of parallel communication connections 182, e.g., the established parallel communication connection that was first to complete the transfer and processing of a previous one of the packets 260.

In accordance with one aspect of the present invention, the client/sender-side APP 124A continues passing packets 260 to available ones of the plurality of parallel socket connections 182 without waiting for transfer to complete for a previously passed one of the packets 260 until all the established plurality of parallel communication connections 182 are utilized. In this manner, the client/sender-side APP 124A transfers the uploaded message or file (e.g., Message A 200) to the server/receiver-side APP 154A more efficiently as a series of parallel packets 260 over the plurality of parallel socket connections 182 that is transparent to the operator of the source one of the client/sender devices 120. At Steps 360 and 370, the client/sender-side APP 124A continues passing the packets 260 to the plurality of parallel socket connections 182 in accordance with the second predetermined procedure implementing the Rule-2 164 or the subsequent first available connection that completed a previous transfer and processing, until the client/sender-side APP 124A receives successful status messages from the server/receiver-side APP 154A via the status section 270 of the header portion 262 of each respective packet and/or the message received over the Control Channel/Connection CC/N 280 that indicates all or a defined number or percentage of the packets 260 were successful transferred (described below). If one or more of the packets 260 fails in transfer and/or processing, the client/sender-side APP 124A resends or again passes the failed one of the packets 260 over a next available one of the plurality of parallel socket connections 182 (following a "Fail" path from Step 370 back to Step 360) until it receives a successful status message for the packet. However, the client/sender-side APP 124A does not resend or again pass a respective one of the packets 260 that is still being transferred and/or processed until it receives the failure status message for the respective one of the packets 260. When a success status message is received for all or the defined number or percentage of the passed packets 260, the client/sender-side APP 124A follows a "Success" path from Step 370 to Step 380 and ends execution. As noted above, in one embodiment, the client/sender-side APP 124A continues transferring packets 260 until it receives the success status message for all packets 260 formed to transmit the content 210 of the message or file, e.g., Message A 200. In another embodiment, the client/sender-side APP 124A terminates the transfer of packets 260 once a defined number or percentage of packets 260 are successfully transmitted and processed by the server/receiver-side APP 154A.

Figure 4:
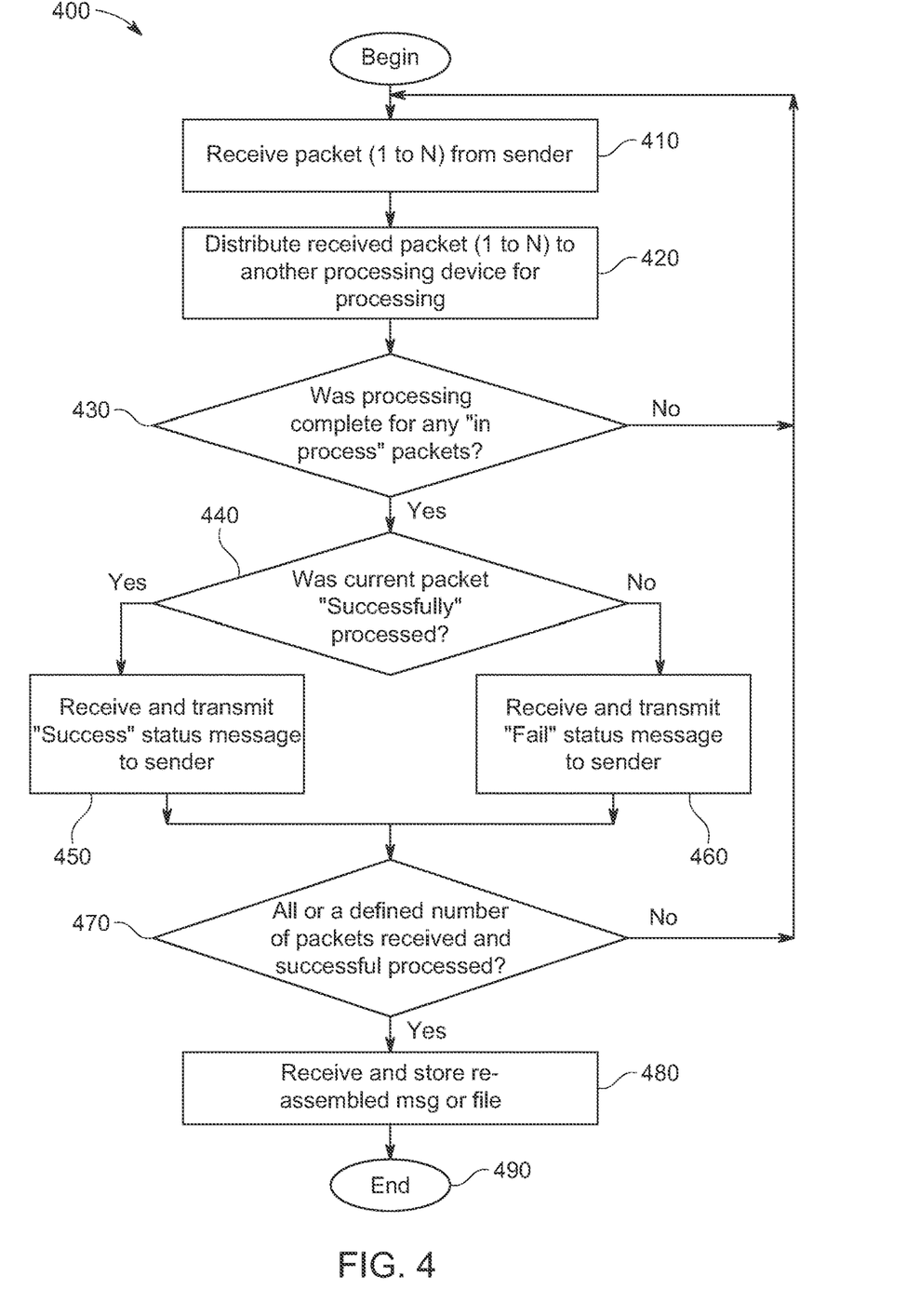
FIG. 4 is a flow diagram of a server/receiver-side method within the communication system of FIG. 1, according to embodiments of the present invention.

As shown in FIG. 4, at Step 410 the server/receiver-side APP 154A executes to receive the packets 260 transferred over the plurality of parallel socket connections 182 from the client/sender-side APP 124A (e.g., the 1 to N packets (P1 to PN) shown in FIG. 1). Once received, at Step 420 the APP 154A continues executing on the server 150 to process each of the received packets 260 by, for example, distributing the received packet 260 to another processing device such as, for example, one of a plurality of logical processing devices 1 to X, shown generally at 192 of FIG. 1. It should be appreciated that, by distributing the received packet 260 to another processing device for processing, the server/receiver-side APP 154A continues executing on the server 150, as shown at Step 430 by following a "No" path, to receive a next one of the packets 260 transferred by the client/sender-side APP 124A over the plurality of parallel socket connections 182 without the CPU utilization to fully process prior received packets 260. In one embodiment, the plurality of logical processing devices 1 to X 192 are operatively coupled to and in communication with data stores 1 to X, shown generally at 194, to store data and information used within the system 100. In one embodiment, the logical processing devices 1 to X 192 are online, on-demand logical server applications such as, for example, an Amazon™ Web Services (AWS™) Lambda service processing device operating on a cloud-based platform 190 and the data stores 1 to X 194 are AWS DynamoDB™ storage service devices accessible on the cloud-based platform 190. Amazon, AWS, and DynamoDB are trademarks of Amazon Technologies, Inc., Seattle, Washinton, USA. It should be appreciated that, while the present disclosure references AWS Lambda service processing device and/or AWS DynamoDB storage service devices, it is within the scope of the present invention to employ other cloud-based processing and/or data storage devices and platforms such as, for example, Google™ Cloud Functions and/or Microsoft™ Azure Functions. Google is a trademark of Google LLC, Mountain View, California, USA. Microsoft is a trademark of Microsoft Corporation, Cincinnati, Ohio, USA. It should also be appreciated that, by utilizing an on-demand processing implementation such as the AWS Lambda service, the present invention benefits by being able to scale (e.g., automatically increase or decrease) resources in response to demands of particular message or file upload requests and the extent (e.g., size) of content 210 being transferred from the client/sender-side APP 124A to the server/receiver-side APP 154A over the plurality of parallel socket connections 182.

In one embodiment, the APP 154A executing on the server 150 invokes one of the plurality of logical processing devices 1 to X 192 to process a received packet 260 by means of an API call through the API Gateway 184, depicted as communication over connections 186A at the server 150 to 186B at one of the processing devices 192, and passes the received packet 260 to the invoked one of the processing devices 1 to X 192 (e.g., at Step 420 above). The invoked one of the processing devices 1 to X 192 receives the packet 260 and processes it, for example, by extracting the one or more content portions 244 within the payload portion 276 of the packet 260, which includes one or more independently processable portions of the content 210 of the message or file (e.g., Message A 200). In one embodiment, the processing of the one or more content portions 244 of the payload 276 by the processing devices 1 to X 192 includes performing further actions on the content portions 244. For example, in one embodiment where the content portion 244 of the payload 276 includes a functional unit of computer code (e.g., a function, procedure, method, object, module, or bounded/delimited portion of code (HTML within markup tags)), the processing may include converting, compiling, decompiling, analyzing, refactoring, or executing the computer code (e.g., converting HTML to JavaScript Object Notation (JSON) or the like). In one embodiment, where the content portion 244 of the payload 276 includes at least a set of numerical data, the processing may include performing an arithmetic operation with or on the set of numerical data. In one embodiment, where the content portion 244 of the payload 276 includes an encoded portion of one of image data, video data, and audio data, the processing may include analyzing or transforming the image data, the video data, or the audio data (e.g., for object or keyword detection or recognition, facial recognition, optical character recognition (OCR), transcription, audio-to-text conversion, or the like). In one embodiment, where the content portion 244 of the payload includes a sentence, paragraph, or section of the text, the processing may include analyzing, transforming, or translating the text. In still another embodiment, where the content portion 244 of the payload 276 includes a set of mathematical equations, the processing may include analyzing, transforming, or evaluating the mathematical equations. In a still further embodiment, it is within the scope of the present invention for the processing devices 1 to X 192 to invoke processing on one of a plurality of third-party processing devices 1 to Y, shown generally at 188, connected to the network 180 and accessible by means of an API call through the API Gateway 184 depicted as communication over connection 187A (FIG. 1). For example, in one embodiment, one of the processing devices 1 to X 192 processing extracted content 244 including text, may invoke a text translation function with an API call to invoke DeepL Translator™ routine executing on one of the third-party processing devices 1 to Y 188. DeepL Translator is a trademark of DeepL SE, Cologne, Germany.

When one of the processing devices 1 to X 192 completes its processing of a packet 260, it stores processed payloads 276A to 276N of the packets P1 to PN in its respective one of the data stores 194, informs the server 150 of its successful processing by generating and passing a "success" status message back to the server 150 for the processed packet, and seeks to process a next one of the received packets P1 to PN. At Steps 440 and 450, the server/receiver-side APP 154A executing on the server 150 receives and communicates the "success" status message for the processed packet back to the client/sender-side APP 124A via the status section 270 of the header portion 262 of the respective packet 260 and/or by sending the message over the Control Channel/Connection CC/N 280. Alternatively, at Steps 440 and 460, if one of the packets P1 to PN 260 fails in transfer or processing, the APP 154A executing on the server 150 receives and communicates a "fail" status message for the packet 260 back to the client/sender-side APP 124A via the status section 270 of the packet and/or over the Control Channel/Connection CC/N 280. When the "fail" status message is received by the client/sender-side APP 124A, the client/sender-side APP 124A attempts to resend the failed packet 260. As noted above, in one embodiment, the server/receiver-side APP 154A executing on the server 150 stores the status messages of the processed packet 260 in the data store 160 as the transfer status messages 168. In one embodiment, when all or a defined quantity or percentage of the transferred packets 260 have been determined to have been successfully processed, at Step 470, one of the logical processing devices 1 to X 192 (e.g., a last executing one of the logical processing devices 1 to X 192), reassembles the processed portions of the stored Payloads 1 to N 276A to 276N and returns the reassembled, now processed, message or file (e.g., Message A (reassembled)) to the server/receiver-side APP 154A executing on the server 150, which in turn, at Step 480, stores the Message A (reassembled) 200' in the data store 160 including each of the processed Payloads 1 to N 276A' to 276N'. As noted above, in one embodiment not all of the transferred packets 260 may need to be successfully received and processed on the server/receiver-side APP 154A executing on the server 150. In such an embodiment, the defined quantity or percentage of the transferred packets 260 is stored in the data store at 166 (labeled "Xfer Qty/Percent"). Once the server/receiver-side APP 154A executing on the server 150 stores the reassembled Message A 200' in the data storage device 160, it sends a final acknowledge message back to the client/sender-side APP 124A executing on the source one of the client/sender devices 120 via the status section 270 of the last processed packet 260 and/or over the Control Channel/Connection CC/N 280 and closes, shuts down, or terminates any remaining open ones of the plurality of parallel socket connections 182 to conclude its processing at Step 490.

Referring again to FIG. 2, in one embodiment, the header portion 262 of the packets 260 optionally includes a content type section 272 that informs a processing device, for example, the server 150 and/or one of the logical processing devices 1 to X 192 what the extracted portions 244 of content 210 within the received packet 260, now within the payload 276, are and how the content 210/payload 276 should be processed. In one embodiment, the header portion 262 of the packets 260 also includes a priority field 274 wherein segments 240 within the assembled packets 260 may be given a priority or preference within the processing by the client/sender-side APP 124A executing on one of the client/sender devices 120, the server/receiver-side APP 154A executing on the server 150, and/or one of the logical processing devices 1 to X 192. It should be appreciated that setting a ranking of priority within the assembled packets 260 may permit a variation in an order of processing to, for example, expedite processing-intense portions of the uploaded message or file to be transferred first, and relatively "light" processing portions to follow, thereby improving the total upload processing time for the full message or file.

It should be appreciated that the phraseology and the terminology used in the description of the various embodiments described herein should be given their broadest interpretation and meaning as the purpose is for describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, and equivalents thereof, and do not preclude the presence or addition of one or more other features, integers, steps, operations, elements, components, groups and/or equivalents thereof.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for sending a message, the system comprising:
   a first processing device and a first memory device in communication with the first processing device, the first memory device storing first instructions that when executed by the first processing device result in:
   dividing the message into a plurality of segments according to a first determined procedure and assigning a respective sequence number to each segment;
   constructing a plurality of packets, each packet comprising a payload and a header, the payload comprising at least one of the segments, and the header comprising a unique message identifier for the packet, the sequence number of each segment of the payload, a total quantity of segments of the message, an indication of a type of content within each segment of the payload, and an indication of a type of processing of the content within each segment of the payload to be performed;
   establishing a plurality of parallel socket connections each to a second processing device; and
   passing respective packets to respective parallel socket connections, which socket connections are selected according to a second determined procedure, for transmission to the second processing device until each segment of a determined number of the total quantity of segments has been successfully received and processed by the second processing device;
   wherein the second determined procedure includes selecting least-recently-busy sockets first.

2. The system of claim 1, wherein a respective segment is processable by the second processing device independent of any other segment.

3. The system of claim 2, wherein the type of content within the respective segment comprises at least one of:
computer code including source code or machine code;
numerical data;
image data;
video data;
audio data;
text; and
mathematical equations.

4. The system of claim 3, wherein the first determined procedure of dividing the message comprises including undivided content of the message in a respective segment, wherein the undivided content comprises at least one of:
a functional unit of the computer code;
a set of the numerical data;
an encoded portion of the image data;
an encoded portion of the video data;
an encoded portion of the audio data;
a sentence, paragraph, or section of the text; and
a set of the mathematical equations.

5. The system of claim 3, wherein the type of processing of the respective segment by the respective second processing device comprises at least one of:
passing the respective segment in part or whole to one of a plurality of third processing devices for processing of the respective segment;
saving the respective segment in part or whole to a database;
converting, compiling, decompiling, analyzing, refactoring, or executing the computer code;
analyzing or performing arithmetic operations with the numerical data;
analyzing or transforming the image data, the video data, or the audio data;
analyzing, transforming, or translating the text; and
analyzing, transforming, or evaluating the mathematical equations.

6. The system of claim 2, wherein each header further comprises a status of transfer and processing of the respective segment.

7. The system of claim 1, wherein the second determined procedure of selecting parallel socket connections further comprises, when a first selected socket connection fails, selecting a next one of the parallel socket connections by at least one of:
round-robin selection;
random selection;
selecting least-recently-busy sockets first;
selecting highest-bandwidth sockets first;
selecting sockets having largest available send-buffer space first; and
selecting sockets on which a packet-acknowledgment message sent by the corresponding second processing device is least-recently-received first.

8. The system of claim 1, wherein the determined number of the segments equals the total quantity of segments of the message.

9. The system of claim 1, wherein a receipt, from the second processing device, of a packet-acknowledgment message indicating a respective sequence number, indicates that the second processing device has successfully received and processed the segment corresponding to the respective sequence number.

10. The system of claim 1, wherein the first processing device executing the first instructions further results in:
assigning a respective priority to each segment;
wherein the passing of the respective packets to the respective parallel socket connections is performed in accordance with the priority assigned to the segment within the respective packet.

11. The system of claim 10, wherein the determined number of the segments consists of all segments having a respective priority greater than a determined priority.

12. The system of claim 1, wherein the determined number of the segments is based on at least one of one of a defined quantity of the total quantity of segments and a defined percentage of the total quantity of segments.

13. A method for sending a message from a first processing device to a second processing device, the method comprising:
dividing the message into a plurality of segments according to a first determined procedure and assigning a respective sequence number to each segment;
constructing a plurality of packets, each packet comprising a payload and a header, the payload comprising at least one of the segments, and the header comprising a unique message identifier for the packet, the sequence number of each segment of the payload, a total quantity of segments of the message, an indication of a type of content within each segment of the payload, and an indication of a type of processing of the content within each segment of the payload to be performed;
establishing a plurality of parallel socket connections each to the second processing device; and
passing respective packets to respective parallel socket connections, which socket connections are selected according to a second determined procedure, for transmission to the second processing device until each segment of a determined number of the total quantity of segments has been successfully received and processed by the second processing device;
wherein the second determined procedure includes selecting least-recently-busy sockets first.

14. The method of claim 13, wherein a respective segment is processable by the second processing device independent of any other segment.

15. The method of claim 14, wherein the type of content within the respective segment comprises at least one of:
computer code including source code or machine code;
numerical data;
image data;
video data;
audio data;
text; and
mathematical equations.

16. The method of claim 15, wherein the first determined procedure of dividing the message comprises including undivided content of the message in a respective segment, wherein the undivided content comprises at least one of:
a functional unit of the computer code;
a set of the numerical data;
an encoded portion of the image data;
an encoded portion of the video data;
an encoded portion of the audio data;
a sentence, paragraph, or section of the text; and
a set of the mathematical equations.

17. The method of claim 15, wherein the type of processing of the respective segment by the respective second processing device comprises at least one of:

passing the respective segment in part or whole to one of a plurality of third processing devices for processing of the respective segment;

saving the respective segment in part or whole to a database;

converting, compiling, decompiling, analyzing, refactoring, or executing the computer code;

analyzing or performing arithmetic operations with the numerical data;

analyzing or transforming the image data, the video data, or the audio data;

analyzing, transforming, or translating the text; and analyzing, transforming, or evaluating the mathematical equations.

18. The method of claim 14, wherein each header further comprises a status of transfer and processing of the respective segment.

19. The method of claim 13, wherein the second determined procedure of selecting parallel socket connections further comprises, when a first selected socket connection fails, selecting a next one of the parallel socket connections by at least one of:

round-robin selection;

random selection;

selecting least-recently-busy sockets first;

selecting highest-bandwidth sockets first;

selecting sockets having largest available send-buffer space first; and selecting sockets on which a packet-acknowledgment message sent by the corresponding second processing device is least-recently-received first.

20. The method of claim 13, wherein the determined number of the segments equals the total quantity of segments of the message.

21. The method of claim 13, wherein a receipt, from the second processing device, of a packet-acknowledgment message indicating a respective sequence number, indicates that the second processing device has successfully received and processed the segment corresponding to the respective sequence number.

22. The method of claim 13, wherein the first processing device executing the first instructions further results in:

assigning a respective priority to each of the plurality of segments;

wherein the passing of the respective packets to the respective parallel socket connections is performed in accordance with the priority assigned to the at least one of the segments within the respective packet.

23. The method of claim 22, wherein the determined quantity of the segments consists of all segments having a respective priority greater than a determined priority.

24. The method of claim 13, wherein the determined number of the total quantity of segments is determined according to a feedback message received from the second processing device.

* * * * *